US010277403B2

United States Patent
Hoffstein et al.

(10) Patent No.: US 10,277,403 B2
(45) Date of Patent: Apr. 30, 2019

(54) DIGITAL SIGNATURE METHOD AND APPARATUS

(71) Applicant: Security Innovation Inc., Wilmington, MA (US)

(72) Inventors: Jeffrey Hoffstein, Providence, RI (US); Jill Pipher, Providence, RI (US); Joseph H Silverman, Needham, MA (US); William J Whyte, Belmont, MA (US); Zhenfei Zhang, Burlington, MA (US)

(73) Assignee: Onboard Security, Inc., Wilmington, MA (US)

( * ) Notice: Subject to any disclaimer, the term of this patent is extended or adjusted under 35 U.S.C. 154(b) by 167 days.

(21) Appl. No.: 15/530,762

(22) Filed: Feb. 24, 2017

(65) Prior Publication Data

US 2017/0250819 A1     Aug. 31, 2017

Related U.S. Application Data

(60) Provisional application No. 62/389,390, filed on Feb. 25, 2016.

(51) Int. Cl.
*H04L 9/30* (2006.01)
*H04L 9/32* (2006.01)
(52) U.S. Cl.
CPC .......... *H04L 9/3247* (2013.01); *H04L 9/3026* (2013.01)
(58) Field of Classification Search
CPC ........................... H04L 9/3247; H04L 9/3026
(Continued)

(56) References Cited

U.S. PATENT DOCUMENTS 6,076,163 A   6/2000  Hoffstein .................... 713/168
6,081,597 A   6/2000  Hoffstein .................... 380/28
(Continued)

FOREIGN PATENT DOCUMENTS

WO   WO2017/008043   1/2017

OTHER PUBLICATIONS

Z. Brakerski et al., "Fully Homomorphic Encryption from Ring-LWE and Security for Key Dependent Messages", Crypto 2011 $31^{st}$ Annual Conference, Santa Barbara, CA, Aug. 2011.

(Continued)

*Primary Examiner* — Jason K Gee
*Assistant Examiner* — Angela R Holmes
(74) *Attorney, Agent, or Firm* — Martin Novack

(57) ABSTRACT

A method for signing and subsequently verifying a digital message, including the following steps: generating an irreducible monic polynomial f(x) of degree n in a ring $F_q[x]$; generating an irreducible monic polynomial F(y) of degree n in a ring $F_q[y]$; producing first and second finite fields as $F_q[x]/(f(x))$ and $F_q[y]/(F(y))$, respectively; producing a secret isomorphism from the first finite field to the second finite field; producing and publishing a public key that depends on F(y); producing a private key that depends on the secret isomorphism; producing a message digest by applying a hash function to the digital message and the public key; producing a digital signature using the message digest and the private key; and performing a verification procedure utilizing the digital signature and the public key.

18 Claims, 11 Drawing Sheets

(58) Field of Classification Search
USPC .......................................................... 713/180
See application file for complete search history.

(56) References Cited

U.S. PATENT DOCUMENTS

| | | | | |
|---|---|---|---|---|
| 6,298,137 | B1 | 10/2001 | Hoffstein | 380/30 |
| 6,959,085 | B1 | 10/2005 | Hoffstein | 380/30 |
| 7,308,097 | B2 | 12/2007 | Hoffstein | 380/28 |
| 7,913,088 | B2 | 3/2011 | Hoffstein | 713/180 |
| 2002/0018560 | A1* | 2/2002 | Lauter | H04L 9/32 380/28 |
| 2002/0062330 | A1* | 5/2002 | Paar | G06F 7/724 708/492 |
| 2005/0025311 | A1* | 2/2005 | Eisentraeger | H04L 9/3073 380/28 |
| 2005/0213758 | A1* | 9/2005 | Lenstra | H04L 9/3013 380/44 |
| 2007/0192397 | A1* | 8/2007 | Lauter | H04L 9/32 708/523 |
| 2013/0339722 | A1 | 12/2013 | Krendelev et al. | |
| 2014/0185794 | A1 | 7/2014 | Yasuda et al. | |
| 2015/0033025 | A1 | 1/2015 | Hoffstein | |
| 2015/0229478 | A1 | 8/2015 | Hoffstein | |
| 2015/0312028 | A1 | 10/2015 | Cheon et al. | |

OTHER PUBLICATIONS

J. Bos et al., "Improved Security for a Ring-Based Fully Homomorphic Encryption Scheme", Cryptography and Coding, 14$^{th}$ IMA International Conf. 2013, Oxford, UK, Dec. 2013.

"Learning A Parallelepiped: Cryptanalysis of GGH and NTRU Signatures", P.Q. Nguyen and O. Regev, Advances in Cryptography—Eurocrypt 2006, Lecture Notes, in Computer Science, vol. 4004, Springer, Berlin (2006).

"NTRUSign: Digital Signatures Using the NTRU Lattice", J. Hoffstein, N. Howgrave Graham, J. Pipher, J. Silverman, and W. Whyte, Topics in Cryptology—CT-RSA 2003, Lecture Notes in Computer Science, vol. 2612, Springer, Berlin (2003).

Hoffstein, J., Silverman, J.H.: Polynomial Rings and Efficient Public Key Authentication II. In: Lam, K.Y., Shparlikski, I., Wang, H., Xing, C. (eds.), Cryptography and Computational Number Theory, Progress in Computer Science and Applied Logic, vol. 20, pp. 269-286, Birkhauser (2001).

Lyubashevsky, V., Fiat-Shamir With Aborts, Applications to Lattice and Factoring-Based Signatures, In: ASIACRYPT 2009, pp. 598-616. Springer (2009).

Gentry, C., Peikert, C., Vaikuntanathan, V.: How to Use a Short Basis: Trapdoors for Hard Lattices and New Cryptographic Constructions. In: Proceedings of the 40th Annual ACM Symposium on Theory of Computing. pp. 197-206. STPC 2008, ACM (2008).

Lyubashevsky, V.: Lattice-Based Identification Schemes Secure Under Active Attacks. In: Cramer, R. (ed.) PKC 2008, LNCS, vol. 4939, pp. 162-179. Springer (2008).

Lyubashevsky, V., Micciancio, D.: Generalized Compact Knapsacks are Collision Resistant. In: Bugliesi, M., Preneel, B., Sassone, V., Wegener, I. (eds.) Automata, Languages and Programming, LNCS, vol. 4052, pp. 144-155. Springer (2006).

Güneysu, T., Lyubashevsky, V., Pöppelmann, T.: Practical Lattice Based Cryptography: A Signature Scheme for Embedded Systems. In: Prouff, E., Schaumont, P. (eds.) CHES 2012, LNCS, vol. 7428, pp. 530-547. Springer (2012).

Ducas, L., Durmus, A., Lepoint, T., Lyubashevsky, V.: Lattice Signatures and Bimodal Gaussians. In: Canetti, R., Garay, J.A. (eds.) CRYPTO 2013, LNCS, vol. 8042, pp. 40-56. Springer (2013).

* cited by examiner $$\mathbb{F}_{5^5} = \frac{\mathbb{Z}/5\mathbb{Z}[x]}{x^5 + x^4 + 4x^3 + x^2 + 4x + 1}$$

| | |
|---|---|
| 0 | $0 + 0x + 0x^2 + 0x^3 + 0x^4$ |
| 1 | $1 + 0x + 0x^2 + 0x^3 + 0x^4$ |
| 2 | $2 + 0x + 0x^2 + 0x^3 + 0x^4$ |
| ⋮ | ⋮ |
| 5 | $0 + 1x + 0x^2 + 0x^3 + 0x^4$ |
| ⋮ | ⋮ |
| 726 | $1 + 0x + 4x^2 + 0x^3 + 1x^4$ |
| ⋮ | ⋮ |
| 731 | $1 + 1x + 4x^2 + 0x^3 + 1x^4$ |
| ⋮ | ⋮ |
| 2614 | $4 + 2x + 4x^2 + 0x^3 + 4x^4$ |
| ⋮ | ⋮ |
| 3124 | $4 + 4x + 4x^2 + 4x^3 + 4x^4$ |

X-Space $$\mathbb{F}_{5^5} = \frac{\mathbb{Z}/5\mathbb{Z}[x]}{y^5 + y^4 + 3y^3 + 2y^2 + 2y + 4}$$

| | |
|---|---|
| 0 | $0 + 0y + 0y^2 + 0y^3 + 0y^4$ |
| 1 | $1 + 0y + 0y^2 + 0y^3 + 0y^4$ |
| 2 | $2 + 0y + 0y^2 + 0y^3 + 0y^4$ |
| ⋮ | ⋮ |
| 180 | $0 + 1y + 2y^2 + 1y^3 + 0y^4$ |
| ⋮ | ⋮ |
| 837 | $2 + 2y + 3y^2 + 1y^3 + 1y^4$ |
| ⋮ | ⋮ |
| 2275 | $0 + 0y + 4y^2 + 2y^3 + 3y^4$ |
| ⋮ | ⋮ |
| 2623 | $3 + 4y + 4y^2 + 0y^3 + 4y^4$ |
| ⋮ | ⋮ |
| 3124 | $4 + 4y + 4y^2 + 4y^3 + 4y^4$ |

Y-Space

Figure 2

$$\mathbb{F}_{5^5} = \frac{\mathbb{Z}/5\mathbb{Z}[x]}{x^5 + x^4 + 4x^3 + x^2 + 4x + 1}$$

$$\mathbb{F}_{5^3} = \frac{\mathbb{Z}/5\mathbb{Z}[x]}{y^5 + y^4 + 3y^3 + 2y^2 + 2y + 4}$$

| | |
|---|---|
| 0 | $0 + 0x + 0x^2 + 0x^3 + 0x^4$ |
| 1 | $1 + 0x + 0x^2 + 0x^3 + 0x^4$ |
| 2 | $2 + 0x + 0x^2 + 0x^3 + 0x^4$ |
| ⋮ | ⋮ |
| 5 | $0 + 1x + 0x^2 + 0x^3 + 0x^4$ |
| ⋮ | ⋮ |
| 726 | $1 + 0x + 4x^2 + 0x^3 + 1x^4$ |
| ⋮ | ⋮ |
| 731 | $1 + 1x + 4x^2 + 0x^3 + 1x^4$ |
| ⋮ | ⋮ |
| 2614 | $4 + 2x + 4x^2 + 0x^3 + 4x^4$ |
| ⋮ | ⋮ |
| 3124 | $4 + 4x + 4x^2 + 4x^3 + 4x^4$ |

| | |
|---|---|
| 0 | $0 + 0y + 0y^2 + 0y^3 + 0y^4$ |
| 1 | $1 + 0y + 0y^2 + 0y^3 + 0y^4$ |
| 2 | $2 + 0y + 0y^2 + 0y^3 + 0y^4$ |
| ⋮ | ⋮ |
| 180 | $0 + 1y + 2y^2 + 1y^3 + 0y^4$ |
| ⋮ | ⋮ |
| 837 | $2 + 2y + 3y^2 + 1y^3 + 1y^4$ |
| ⋮ | ⋮ |
| 2275 | $0 + 0y + 4y^2 + 2y^3 + 3y^4$ |
| ⋮ | ⋮ |
| 2623 | $3 + 4y + 4y^2 + 0y^3 + 4y^4$ |
| ⋮ | ⋮ |
| 3124 | $4 + 4y + 4y^2 + 4y^3 + 4y^4$ |

X-Space     $x \mapsto \phi(y) = 4y^4 + 4y^2 + 4y + 3$     Y-Space

Figure 3

| | a4 x^4 + a3 x^3 + 2x^2 + 2x + 2 and its images | | | | | | |
|---|---|---|---|---|---|---|---|
| 62 | 687 | 1312 | 1937 | 2562 | 1622 | 520 | 2048 | 1071 | 2599 |
| 187 | 812 | 1437 | 2062 | 2687 | 2608 | 1506 | 534 | 2057 | 1080 |
| 312 | 937 | 1562 | 2187 | 2812 | 1119 | 2517 | 1540 | 568 | 2091 |
| 437 | 1062 | 1687 | 2312 | 2937 | 2100 | 1003 | 2526 | 1554 | 577 |
| 562 | 1187 | 1812 | 2437 | 3062 | 611 | 2014 | 1037 | 2560 | 1588 |

Figure 4A

| $2x^4 + 2x^3 + a_2 x^2 + a_1 x + 2$ and its images | | | | | | | | |
|---|---|---|---|---|---|---|---|---|
| 1502 | 1527 | 1552 | 1577 | 1602 | | 70 | 1387 | 2829 | 1041 | 2483 |
| 1507 | 1532 | 1557 | 1582 | 1607 | 2543 | 855 | 2197 | 389 | 1826 |
| 1512 | 1537 | 1562 | 1587 | 1612 | 1886 | 203 | 1540 | 2982 | 1199 |
| 1517 | 1542 | 1567 | 1592 | 1617 | 1359 | 2696 | 888 | 2325 | 542 |
| 1522 | 1547 | 1572 | 1597 | 1622 | 702 | 2044 | 356 | 1698 | 3010 |

Figure 4B

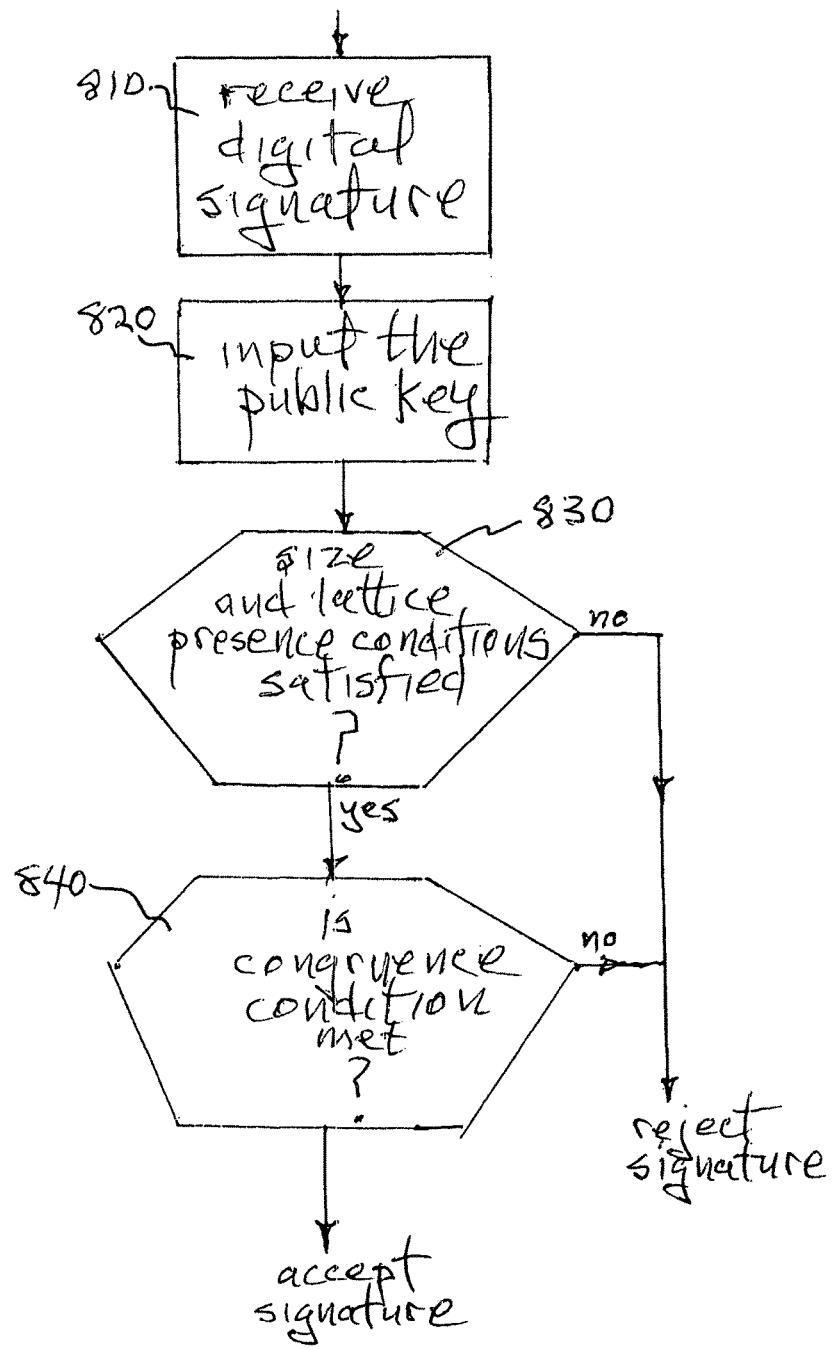

DIGITAL SIGNATURE METHOD AND APPARATUS

RELATED APPLICATION

This application claims priority from U.S. Provisional Patent Application No. 62/389,390 filed Feb. 25, 2016, and said Provisional Patent Application is incorporated herein by reference.

FIELD OF THE INVENTION

This invention relates to the field of cryptography and, more particularly, to a public key digital signature technique and system.

BACKGROUND OF THE INVENTION

Public key digital signatures are important for secure exchange of information between plural parties, for example between computers or mobile devices, between a smart card and a terminal, etc.

An earlier digital signature and authentication method and apparatus was described in U.S. Pat. No. 7,308,097, assigned to the same assignee as the present Application. Reference can also be made to "NTRUSign: Digital Signatures Using the NTRU Lattice", J. Hoffstein, N. Howgrave Graham, J. Pipher, J. Silverman, and W. Whyte, Topics In Cryptology-CT-RSA 2003, Lecture Notes in Computer Science, Vol. 2612, Springer, Berlin, 2003.

The signing technique in the '097 Patent uses a mixing system based on multiplication in a ring and reduction modulo an ideal q in that ring; while the verification technique uses special properties of products of elements whose validity depends on elementary probability theory. The security of the identification/digital signature scheme comes from the interaction of reduction modulo q and the difficulty of forming products with special properties. In an embodiment of the digital signature scheme of the '097 Patent, the security also relies on the experimentally observed fact that for most lattices, it is very difficult to find a vector whose length is only a little bit longer than the shortest vector, and it is also difficult to find a lattice vector that is quite close to a randomly chosen nonlattice vector.

An improvement over the technique of the '092 Patent, which had reduced complexity and computational requirements for key generation and signing, was disclosed in copending U.S. patent application Ser. No. 14/544,426, assigned to the same assignee as the present Application, published as U.S. Patent Application Publication No. US2015/0229478, incorporated herein by reference. In a form of that invention, sometimes referred to a "pqNTRU-Sign" (mark of Security Innovation, Inc.), a method is set forth for signing and subsequently verifying a digital message, comprising the following steps implemented using at least one processor-based subsystem: selecting parameters including an integer q and a relatively smaller integer p that is coprime with q; generating random polynomial f relating to p and random polynomial g relating to q; producing a public key that includes h, where h is equal to a product that can be derived using g and the inverse of f mod q; producing a private key from which f and g can be derived; storing the private key and publishing the public key; producing a message digest by applying a hash function to the digital message; producing a digital signature using the message digest and the private key; and performing a verification procedure utilizing the digital signature and the public key to determine whether the signature is valid.

It is among the objectives hereof to devise a digital signature method and system that has advantages over existing digital signature techniques, including those of the type described hereinabove.

SUMMARY OF THE INVENTION

The present invention utilizes, inter alia, a secret isomorphism between two finite fields to create a signature scheme.

In accordance with an embodiment of the invention, a method is set forth for signing and subsequently verifying a digital message, comprising the following steps implemented using at least one processor-based subsystem: generating an irreducible monic polynomial $f(x)$ of degree n in a ring $F_q[x]$; generating an irreducible monic polynomial $F(y)$ of degree n in a ring $F_q[y]$; producing first and second finite fields as $F_q[x]/(f(x))$ and $F_q[y]/(F(y))$, respectively; producing a secret isomorphism from the first finite field to the second finite field; producing and publishing a public key that depends on $F(y)$; producing a private key that depends on said secret isomorphism; producing a message digest by applying a hash function to the digital message and the public key; producing a digital signature using the message digest and the private key; and performing a verification procedure utilizing the digital signature and the public key to determine whether the signature is valid.

In a form of the embodiment just set forth, the first and second finite fields are designated, respectively, as x-space and y-space, and a further step comprises generating a specified lattice in x-space and using said isomorphism to generate a corresponding lattice in y-space, and the step of producing said digital signature includes initially producing a signature in the x-space lattice and then producing the digital signature in the corresponding y-space lattice.

In accordance with another embodiment of the invention, a method is set forth signing and sending a digital message, including the following steps implemented using at least one processor-based subsystem: generating an irreducible monic polynomial $f(x)$ of degree n in a ring $F_q[x]$; generating an irreducible monic polynomial $F(y)$ of degree n in a ring $F_q[y]$; producing first and second finite fields as $F_q[x]/(f(x))$ and $F_q[y]/(F(y))$, respectively; producing a secret isomorphism from the first finite field to the second finite field; producing and publishing a public key that depends on $F(y)$; producing a private key that depends on said secret isomorphism; producing a message digest by applying a hash function to the digital message and the public key; producing a digital signature using the message digest and the private key; and transmitting the digital signature.

In accordance with a further form of the invention, a system is set forth for signing and subsequently verifying a digital message, including: at least one processor-based subsystem that is programmed with instructions that cause the at least one processor subsystem to implement the following steps: generating an irreducible monic polynomial $f(x)$ of degree n in a ring $F_q[x]$; generating an irreducible monic polynomial $F(y)$ of degree n in a ring $F_q[y]$; producing first and second finite fields as $F_q[x]/(f(x))$ and $F_q[y]/(F(y))$, respectively; producing a secret isomorphism from the first finite field to the second finite field; producing and publishing a public key that depends on $F(y)$; producing a private key that depends on said secret isomorphism; producing a message digest by applying a hash function to the digital message and the public key; producing a digital signature using the message digest and the private key; and performing a verification procedure utilizing the digital signature and the public key to determine whether the signature is valid.

As described herein (see e.g. Appendix I), for reasons including the non-linear nature of the homomorphic encryption map, the effectiveness of attacks on the signature scheme of the invention is lessened, which enhances security and allows for smaller signatures and improved operating characteristics compared to existing signature schemes.

Further features and advantages of the invention will become more readily apparent from the following detailed description when taken in conjunction with the accompanying drawings.

BRIEF DESCRIPTION OF THE DRAWINGS

FIG. 2 shows an example of a first finite field (also sometimes designated as x-space) and a second finite field (also sometimes designated as y-space), that is useful in understanding operation of the invention.

FIG. 3 again illustrates the finite fields of the FIG. 2 example, and also illustrates an exemplary isomorphism between polynomials of the respective finite fields, and shows some of the mappings between polynomials of the respective finite fields for an example in which the isomorphism is defined by a particular function that maps from polynomials of the first finite field (x-space) to polynomials of the second finite field (y-space).

FIG. 4A shows, on the left, a table of polynomial values in x-space, evaluated at an arbitrary value of x and, on the right, a table of corresponding (that is, mapped in accordance with the exemplary isomorphism) polynomial values in y-space. The tables illustrate the scrambling of the values that occurs in y-space.

FIG. 4B shows tables similar to those of FIG. 4A, but for a different group of polynomials. Again, the tables illustrate the scrambling of values that occurs in y-space.

FIG. 8 is a flow diagram, in accordance with an embodiment hereof, of a routine for verification of a digital signature.

DETAILED DESCRIPTION

Figure 1:
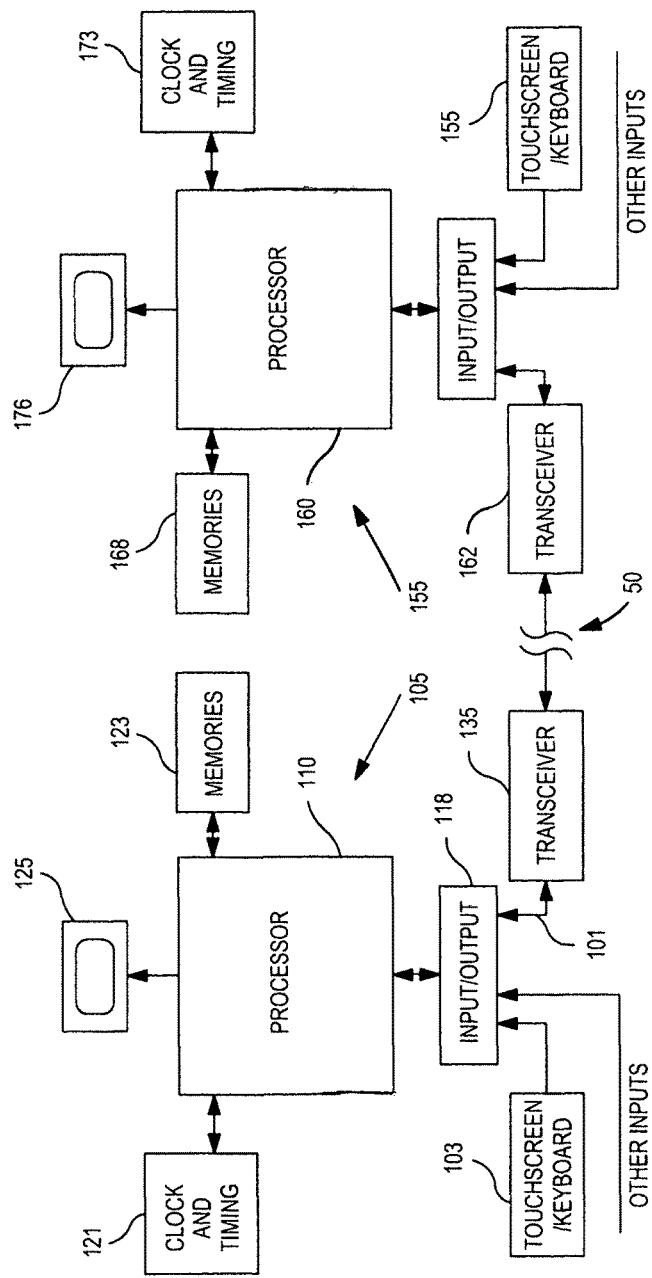
FIG. 1 is a block diagram of a system that can be used in practicing embodiments of the invention.

FIG. 1 is a block diagram of an example of a system that can be used in practicing embodiments of the invention. Two processor-based subsystems 105 and 155 are shown as being in communication over a channel 50, which may be, for example, any wired or wireless communication channel such as a telephone or internet communication channel in, for example, a cloud-based system. In the example hereof, the channel can be considered a secure or an insecure channel. The subsystem 105 includes processor 110 and the subsystem 155 includes processor 160. The subsystems can typically comprise mobile devices, computers, or terminals. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The subsystem 105 will typically include memories 123, clock and timing circuitry 121, input/output functions 118 and display 125, which may all be of conventional types. Inputs can include a touchscreen/keyboard input as represented at 103. Communication is via transceiver 135, which may comprise any suitable device for communicating signals.

The subsystem 155 in this illustrative embodiment can have a similar configuration to that of subsystem 105. The processor 160 has associated input/output circuitry 164, memories 168, clock and timing circuitry 173, and a display 176. Inputs include a touchscreen/keyboard 155. Communication of subsystem 155 with the outside world is via transceiver 162.

Co-inventors hereof, Jeffrey Hoffstein and Joseph Silverman, are inventors of copending PCT International Application No. PCT/US2016/041598, published as PCT Publication No. WO/2017/008043, entitled "Homomorphic Encryption", and said PCT Publication is incorporated herein by reference. The '598 Application discloses systems, methods, and computer-readable storage devices storing instructions for homomorphic encryption via finite ring isomorphisms that includes constructing an isomorphism and an inverse isomorphism and using these for encryption that is homomorphic, in that certain operations can be performed on encrypted data without the need for first decrypting the data.

Consider $\mathbb{F} = Z/qZ[x]/(f(x))$, a finite field $\mathbb{F}_{q^n}$ of order $q^n$. $f(x)$ and $F(y)$ define two copies of $\mathbb{F}_{q^n}$, and $Z/qZ[x]/(f(x)) \cong Z/qZ[y]/(F(y))$ is a finite field isomorphism under a secret mapping $x \to \phi(y)$.

FIG. 2 illustrates an example of the first finite field $\mathbb{F}_q(x)/f(x)$ (represented in conjunction with the lefthand box of the Figure) and the second finite field $\mathbb{F}_q(y)/F(y)$ (represented in conjunction with the righthand box of the Figure). [In mathematical language, the first finite field is the quotient of the ring of polynomials in x, with coefficients mod q, by the ideal generated by the irreducible polynomial f(x), and the second finite field is the quotient of the ring of polynomials in y, with coefficients mod q, by the ideal generated by the irreducible polynomial F(y).] In this example, n=5 and there are 3125 (equals $5^5$) polynomials listed in each box in an indexed order, with increasing coefficient values. In this example, the polynomial f(x) is $x^5+x^4+4x^3+x^2+4x+1$, and the polynomial F(y) is $y^5+y^4+3y^3+2y^2+2y+4$.

In the illustrative example of FIG. 3, which again shows the finite fields, the secret isomorphism between the finite fields is selected to be represented by the polynomial $\phi(y) = 4y^4+4y^2+4y+3$; that is, x in the finite field $\mathbb{F}_q(x)/f(x)$ (which is designated as x-space) maps to $4y^4+4y^2+4y+3$ in the finite field $\mathbb{F}_q(y)/F(y)$ (which is designated as y-space). The arrows shown between x-space and y-space in FIG. 3 illustrate some of the mappings for this isomorphism.

As an example, the following calculations show how the index #726 (polynomial $1+0x+4x^2+0x^3+1x^4$) of the x-space finite field, maps to the index #837 (polynomial $2+2y+3y^2+1y^3+1y^4$) of the y-space finite field. Using $3+4y+4y^2+4y^4$ for x in the expression $1+4x^2+x^4$ gives $1+4(3+4y+4y^2+4y^4)^2+(3+4y+4y^2+4y^4)^4$. When this is expanded and coefficients are reduced mod 5, the result is the long polynomial:

$$A(y)=3+3y+y^2+4y^3+y^4+4y^5+4y^6+y^7+y^9+4y^{10}+2y^{11}+4y^{12}+4y^{13}+4y^{14}+y^{16}$$

and this can be written as:

$$A(y)=(1+y)^2(4+2y+2y^2+3y^3+y^4+y^5)(4+4y+2y^2+3y^3+2y^4+4y^5+2y^6+2y^7+2y^8+y^9)+2+2y+3y^2+y^3+y^5 \bmod 5.$$

This expression [A(y)] must be modded by F(y), which, in this example, is $y^5+y^4+3y^3+2y^2+2y+4$, so:

$$A(y)=(4+4y+2y^2+3y^3+2y^4+4y^5+2y^6+2y^7+2y^8+y^9)(1+y)^2(F(y))+2+2y+3y^2+y^3+y^4 \bmod 5.$$

So, in other words, when A(y) is divided by F(y) mod 5, the remainder is $2+2y+3y^2+y^3+y^4$, which, in the example of FIG. 3, is the polynomial index #837 in y-space. Ergo, polynomial index #726 in x-space maps to polynomial index #837 in y-space.

The foregoing also demonstrates that $1+4x^2+x^4$ maps to $1+4$ (image of $x)^2$+(image of $x)^4$ which demonstrates the homomorphic mapping property; that is, additive and multiplicative structure is preserved under the mapping.

Also, x maps to image of $x=3+4y+4y^2+4y^4$, which means that $f(x)=x^5+x^4+4x^3+x^2+4x+1$ maps to $F(y)=(3+4y+4y^2+4y^4)^5+(3+4y+4y^2+4y^4)^4+4(3+4y+4y^2+4y^4)^3+(3+4y+4y^2+4y^4)^2+4(3+4y+4y^2+4y^4)+1$.

Since f(x) is zero in x-space (since $F_q[x]$ is modded by f(x)), it should map to zero in y-space. The following demonstrates that it does.

Expanding $F(y)$ mod 5 gives $4+4y+y^3+3y^4+2y^5+4y^6+2y^7+y^8+4y^9+y^{10}+2y^{11}+4y^{13}+y^{16}+4y^{20}$ and if this is factored mod 5, one gets $$4(4+2y+2y^2+3y^3+y^4+y^5)(4+2y^2+2y^3+4y^4+y^5)(1+3y+2y^3+y^4+3y^5+2y^6+2y^7+y^8+y^{10}).$$

$$F(y)=4+2y+2y^2+3y^3+y^4+y^5$$

So $A(y)=4(4+2y^2+2y^3+4y^4+y^5)(1+3y+2y^3+y^4+3y^5+2y^6+2y^7+y^8+y^{10})F(y) \bmod 5.$ Stated another way, when the polynomial that is mapped to [called A(y)] is divided by F(y), the remainder is zero, so zero maps to zero, as it should.

The tables of FIGS. 4A and 4B illustrate the property hereof that the isomorphism doesn't "see" the sizes of the coefficients of the x polynomials, which is an indication that images in y-space are not revealing of relevant information about x-space. FIGS. 4A and 4B show two examples of the principle. Both examples involve the same finite fields and the same secret mapping isomorphism as in FIGS. 2 and 3.

In FIG. 4A, twenty five polynomials in x-space are defined by the exemplary general polynomial $f(x)=a_4x^4+a_3x^3+2x^2+2x+2$, where $a_4$ and $a_3$ can each take on any of the five values 0, 1, 2, 3, or 4, so that there are 25 possible polynomials. In the FIG. 4A table on the left $a_4$ varies from 0 to 4 on the horizontal axis and $a_3$ varies from 0 to 4 on the vertical axis. The numerical value in each of the 25 boxes is the value of the polynomial for the particular box, evaluated at x=5. For example, the upper leftmost box of the table, where $a_4=0$ and $a_3=0$, accordingly is associated with the polynomial $f(x)=2x^2+2x+2$ which, evaluated at x=5, is (2)(25)+(2)(5)+2=62. As another example, consider the lower rightmost box of the table, where $a_4=4$ and $a_3=4$, so the associated polynomial is $f(x)=4x^4+4x^3+2x^2+2x+2$ which, evaluated at x=5, is 4(625)+4(125)+2(25)+2(5)+2=3062.

In the FIG. 4A table on the right, each of the 25 boxes is associated with the polynomial F(y) that is the y-space image of the x-space polynomial f(x) in the corresponding box of the table on the left. The number in each box is the value of the associated polynomial, evaluated at y=5.

In FIG. 4B, twenty five polynomials in x-space are defined by another exemplary polynomial $f(x)=2x^4+2x^3+a_2x^2+a_1x+2$, where $a_2$ and $a_1$ can, again, take on any of the five values, 0, 1, 2, 3, or 4 so that there are 25 possible polynomials. In the FIG. 4B table on the left $a_2$ varies from 0 to 4 on the horizontal axis and $a_1$ varies from 0 to 4 on the vertical axis. As before, the numerical value in each of the 25 boxes is the value of the polynomial for the particular box, evaluated at x=5. In this case, for example, the upper leftmost box of the table, where $a_2=0$ and $a_1=0$, accordingly is associated with the polynomial $f(x)=2x^4+2x^3+2$ which, evaluated at x=5, is (2)(625)+(2)(125)+2=1502. As another example, consider the lower rightmost box of the table, where $a_2=4$ and $a_1=4$, so the associated polynomial is $f(x)=2x^4+2x^3+4x^2+4x+2$ which, evaluated at x=5, is 2(625)+2(125)+4(25)+4(5)+2=1622.

In the FIG. 4B table on the right, each of the 25 boxes is again associated with the polynomial F(y) that is the y-space image of the x-space polynomial f(x) in the corresponding box of the table on the left. The number in each box is the value of the associated polynomial, evaluated at y=5.

Accordingly, FIGS. 4A and 4B illustrate the scrambling that occurs in y-space as a result of the defined process using the secret isomorphism. As seen in the examples of these Figures, although the values of the selected polynomials in x-space are generally ordered in their tables, the y-space polynomials have no discernable order in their respective tables.

Figure 5:
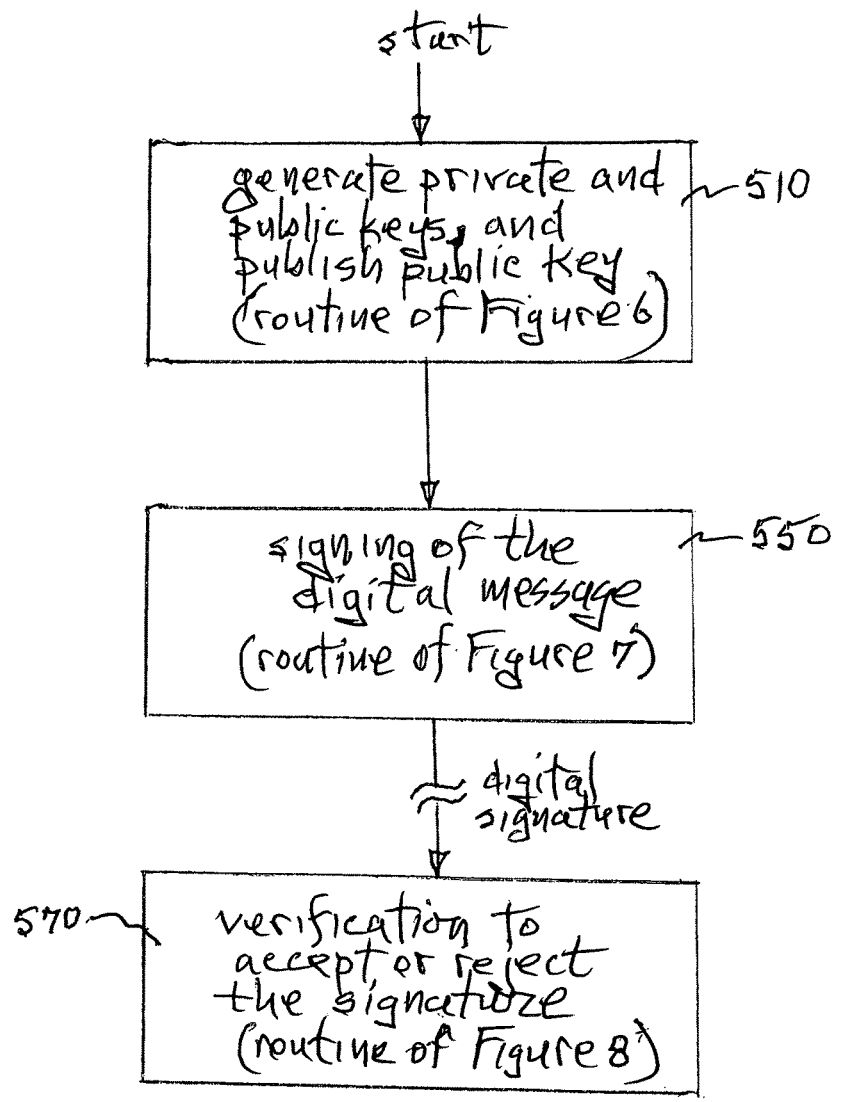
FIG. 5 is a flow diagram of a public key digital signature technique which, when taken with the subsidiary flow diagrams referred to therein, can be used in implementing embodiments of the invention.

FIG. 5 illustrates a basic procedure that can be utilized with a public key digital signature technique, and refers to routines illustrated by other referenced flow diagrams which describe features in accordance with an embodiment of the invention. Reference can also be made to Appendix I for further details of embodiments of the invention. The block 510 represents the generating of the public key and private key signals and data, and the publishing of the public key. The routine of an embodiment thereof is described in conjunction with the flow diagram of FIG. 6. In the present example, this operation can be performed, for example, at the processor-based subsystem 105 of FIG. 1. The public key information can be published; that is, made available to any member of the public or to any desired group to whom the private key holder desires to send the digital signatures. Typically, although not necessarily, the public key may be made available at a central public key library facility or website where a directory of public key holders and their public keys are maintained.

The block 550 represents a routine that can be employed (that is, in this example, by the user of processor-based subsystem 105 of FIG. 1) for signing the digital message. This routine, in accordance with an embodiment of the invention, is described in conjunction with the flow diagram of FIG. 7. In this example, the digital signature is then transmitted over the channel 50 (FIG. 1), although it will be understood that the digital signature can, if desired, be stored and subsequently retrieved and verified, depending on the application or task being undertaken.

The block 570 represents a routine that can be employed (that is, in this example, by the user of processor-based subsystem 155 of FIG. 1) for using, inter alia, the public key to implement a verification procedure to either accept or reject the digital signature. This routine, in accordance with an embodiment of the invention, is described in conjunction with the flow diagram of FIG. 8.

Figure 6:
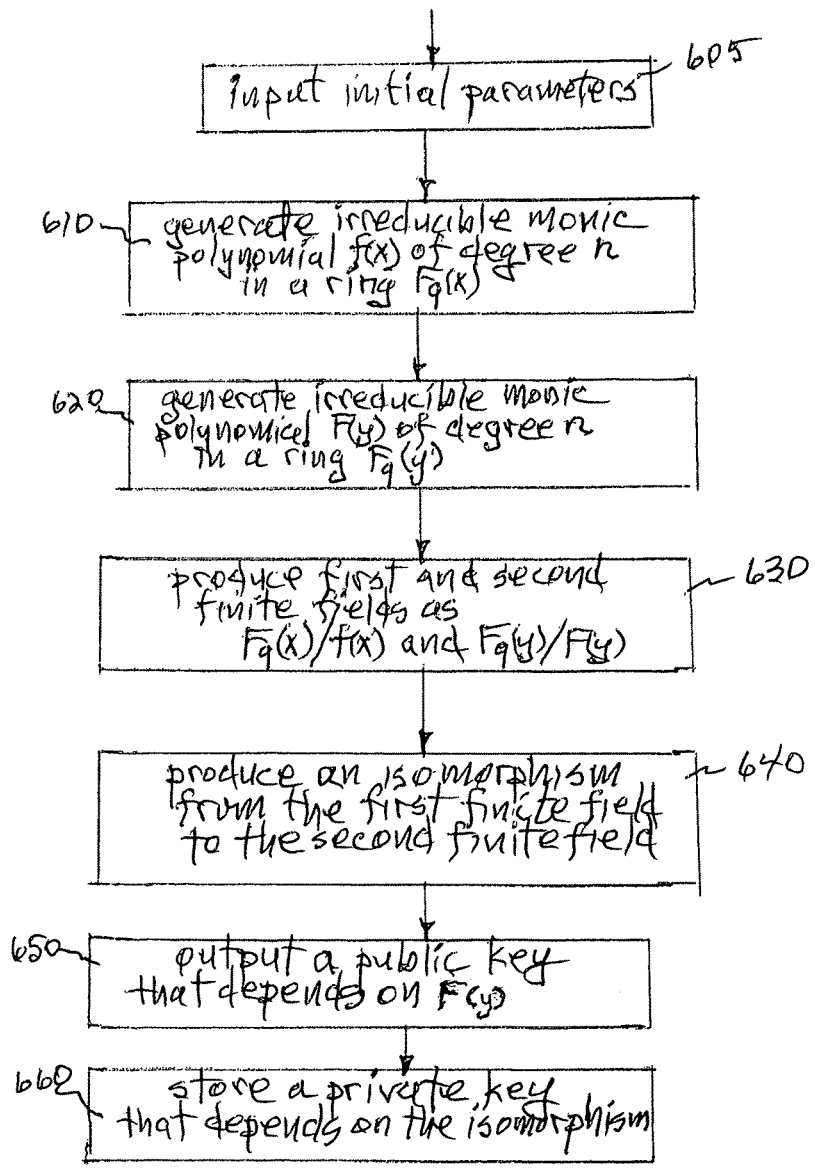
FIG. 6 is a flow diagram, in accordance with an embodiment hereof, of a routine for key generation.

FIG. 6 is a flow diagram of a routine, represented generally by the block 510 of FIG. 5, in accordance with an embodiment of the invention, for implementing key generation. Reference can also be made to Appendix I. The block 605 represents the inputting of initial parameters as, for example, described in Appendix I. The block 610 represents generating of an irreducible monic polynomial f(x) of degree n in a ring $F_q(x)$, and the block 620 represents generating of an irreducible monic polynomial F(y) of degree n in a ring $F_q(y)$. Then, as represented by the block 630, first and second finite fields are produced as $F_q(x)/f(x)$ and $F_q(y)/F(y)$, respectively. Next, as represented by the block 640, an isomorphism is produced from the first finite field to the second finite field. This can be, for example, an isomorphism e.g. in the form of a matrix or a polynomial of the type illustrated in conjunction with FIG. 3 as the mapping polynomial ϕ, but of a magnitude commensurate with a desired degree of security. A public key that depends on F(y) can then be output (block 650) and, typically, published. A private key, which depends on the isomorphism, is stored (block 660) for subsequent use.

Figure 7:
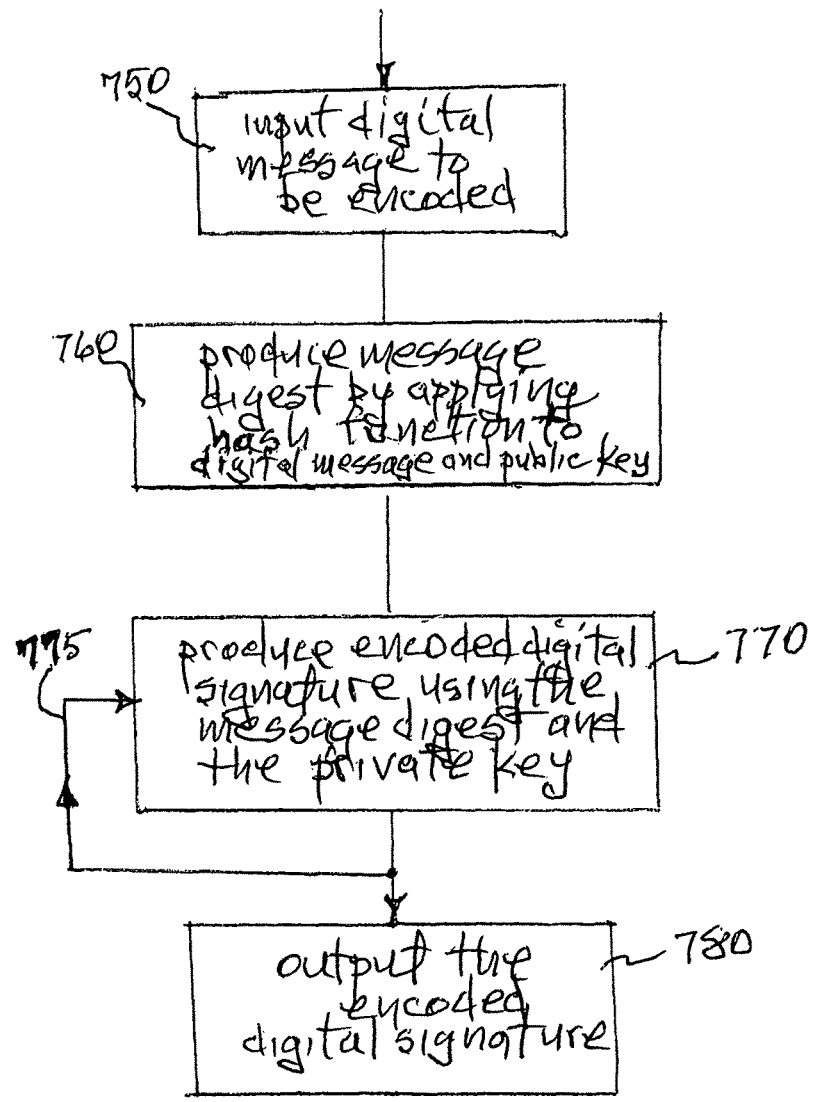
FIG. 7 is a flow diagram, in accordance with an embodiment hereof, of a routine for signing a digital message.

FIG. 7 is a flow diagram of a routine, represented by the block 550 of FIG. 5, in accordance with an embodiment of the invention, for implementing the signing of a digital message that is to be stored and/or transmitted. Reference can also be made to Appendix I. The block 750 represents the inputting of the digital message that is to be encoded. Then, as represented by the block 760, a message digest is produced by applying a hash function to the digital message and the public key. The encoded digital signature is then produced (block 770) using the message digest and the private key. The encoded digital signature can then be output (block 780). If desired, an optional rejection sampling technique, represented by loop 775, can be employed, as set forth in copending U.S. patent application Ser. No. 14/121,041 (published as U.S. Patent Application Publication No. US2015/0033025) to check a candidate signature to determine if it may leak information that could be used in a transcript of signatures to reveal information about the public key and, if so, modifying one or more parameters used in producing the candidate digital signature, the procedure being repeated until an acceptable signature is obtained.

FIG. 8 is a flow diagram of a routine, represented by the block 570 of FIG. 5, in accordance with an embodiment of the invention, for implementing verification to accept or reject the digital signature. The block 810 represents the receiving of the digital signature, and the block 820 represents the inputting of the public key. Then, the decision block 830 represents the determination of whether the collective components of these and other inputs satisfy predetermined size and lattice presence conditions. If not, the signature is rejected. If so, however determination is also made (decision block 840) as to whether a predetermined congruence condition is met. If so, the digital signature is considered verified.

Figure 9A:
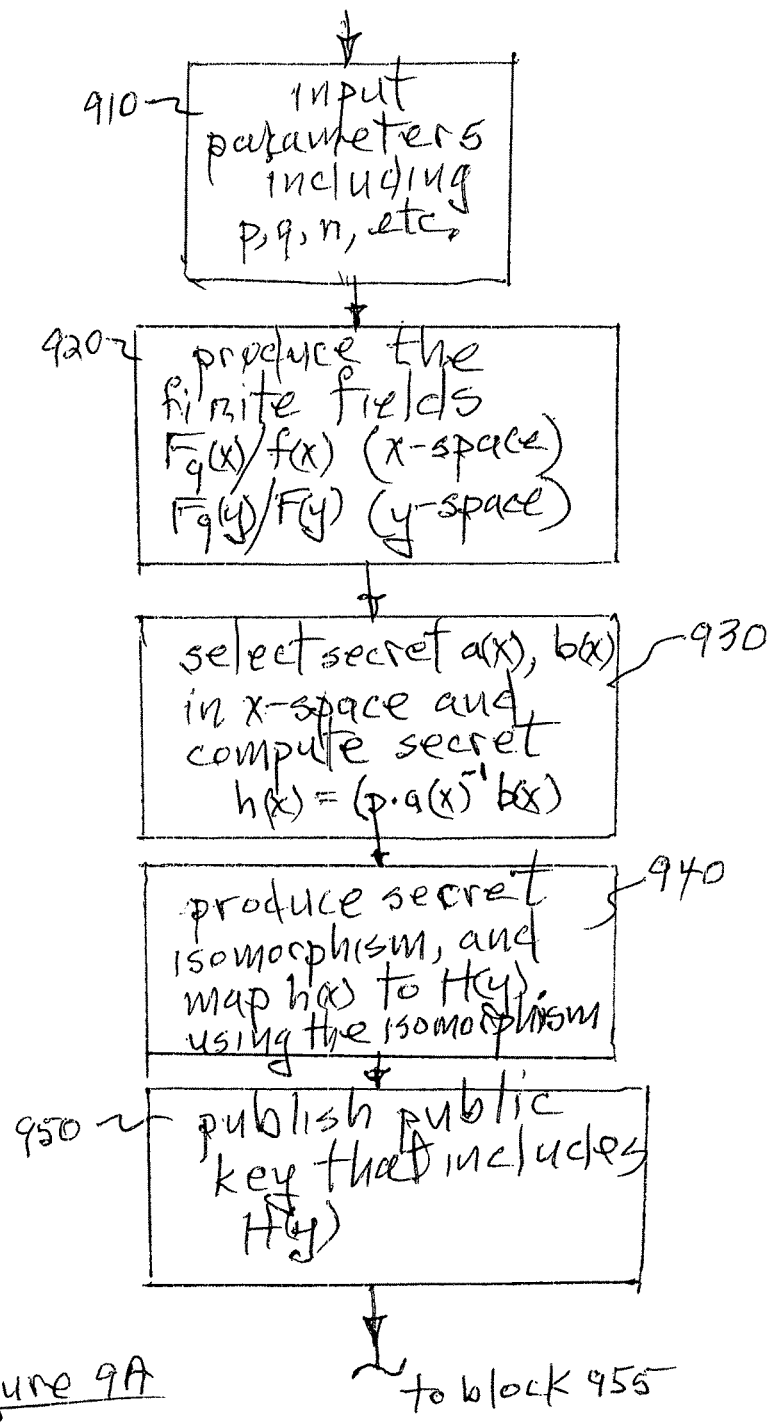
FIG. 9, which includes FIGS. 9A and 9B placed one below another, is a flow diagram, in accordance with an embodiment hereof, of a further, and more detailed, routine for signing and subsequently verifying a digital message.
Figure 9B:
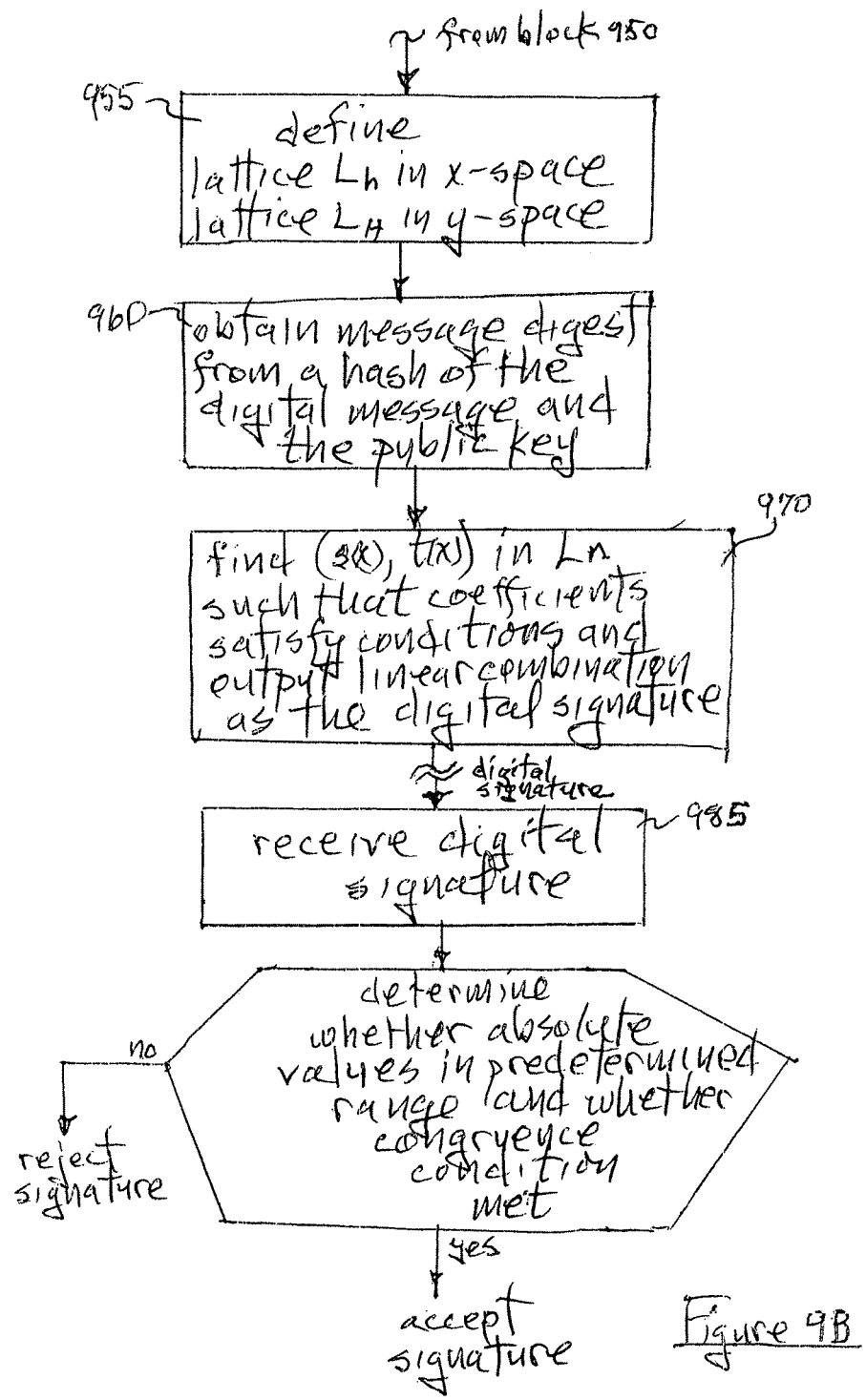

FIG. 9 is a flow diagram of a routine in accordance with a further embodiment of the invention for encoding and decoding a digital message. Reference can be made to Appendix I for further details. The block 910 represents inputting parameters such as p, q, n, and other parameters as described in Appendix I. The finite fields $F_q(x)/(f(x))$ (x-space, as described above) and $F_q(y)/(F(y))$ (y-space, as described above) are produced, as represented by the block 920. Next, the block 930 represents the selection of secret a(x), b(x) in x-space with small coefficients, and the computation of a secret $h(x)=(pa(x))^{-1}b(x)$. (As used herein in this context, a small coefficient is an integer with absolute value less than c, where c is significantly less than q, an example being q=2048, c=4.) Then, as represented by the block 940, a secret isomorphism (such as ϕ in FIG. 3) is produced, mapping h(x) (in x-space) to H(y) (in y-space). A public key that includes H(y) can then be published (block 950). Then, as represented by the block 955, a lattice $L_h$ is produced in x-space and a lattice $L_H$ is produced in y-space. $L_h$ is the set of all pairs of polynomials (s(x), t(x)) of degree less than or equal to n−1 such that t(x) is equivalent to S(x)h(x) mod(f(x),q), and $L_H$ is the set of all pairs of polynomials (S(y), T(y)) of degree less than or equal to n−1 such that T(y) is equivalent to S(y)H(y) mod (F(y),q).

A message digest is obtained from a hash of the digital message and the public key (block 960). In this embodiment, the message digest is a 2n dimensional polynomial $(d_0, d_1, \ldots d_{n-1}, e_0, e_1 \ldots e_{n-1})$, with coefficients chosen from the interval [−p/2, p/2]. The block 970 represents finding (s(x), t(x)) in $L_n$ such that the 2n dimensional vector of coefficients from (s(x), t(x)) satisfies the correct bound on absolute values, and is congruent to a specified 2n dimensional vector determined by the message digest and the polynomials $C_i(y)$. The coefficients of this linear combination are output as the digital signature. Then, as represented by the block 985, the digital signature is received and subject to a verification procedure. In this embodiment, a determination is made (decision block 995) as to whether the linear combination of $C_i(y)$ is in $L_H$ and, also, whether the 2n dimensional vector of coefficients has absolute values in a predetermined range and is congruent to $(d_0, d_1 \ldots d_{n-1}, e_0, e_1, \ldots e_{n-1})$ mod p. If both criteria are satisfied, the digital signature is verified. If not, it is rejected.

The invention has been described with reference to particular preferred embodiments, but variations within the spirit and scope of the invention will occur to those skilled in the art. For example, while a digital signature technique has been described, it will be understood that an authentication procedure of the challenge-response-verification type can alternatively be implemented, using the technique hereof and employing the challenge as the message to be signed. Also, it will be understood that coefficients of polynomials can alternatively be represented in other forms including, but not limited to, matrices.

APPENDIX I

There are a number of possible methods of using a secret isomorphism between two finite fields to create a signature scheme. In the following, a method we call "pqFF-Sign" is set forth.

The approach utilizes the existing transcript-secure signature scheme pq-NTRUSign and also utilizes a finite field isomorphism. The pq-NTRUSign signature scheme is employed in a finite field $\mathbb{F}_q{}^n$, and then the signature is homomorphically mapped to a different copy of the field $\mathbb{F}_q{}^n$. Verification is still possible due to the homomorphic property of the map, but various lattice attacks that may have been possible on pq-NTRUSign are blunted or eliminated due to the non-linear nature of the homomorphic encryption map.

n a dimension parameter.

q a prime (or prime power) greater than a constant times n.

p a small prime (often taken to be 2).

$f(x) \in \mathbb{F}_q[x]$ a short irreducible monic polynomial of degree n.

$F(y) \in \mathbb{F}_q[y]$ a random irreducible monic polynomial of degree n.

$\phi(y) \in \mathbb{F}_q[y]$. The map $x \mapsto \phi(y)$ induces an isomorphism $\mathbb{F}_q[x]/(f(x)) \to \mathbb{F}_q[y]/(F(y))$.

$\psi(x) \in \mathbb{F}_q[x]$ the map $y \mapsto \psi(x)$ induces the inverse isomorphism $\mathbb{F}_q[y]/(F(y)) \to \mathbb{F}_q[x]/(f(x))$.

$a(x), b(x) \in \mathbb{F}_q[x]$ short irreducible monic polynomials of degree n.

$h(x) \in \mathbb{F}_q[x] \equiv b(x) \cdot (pa(x))^{-1} \pmod{q}$.

$H(y) \in \mathbb{F}_q[y] \equiv h(\phi(y)) \pmod{q, F(y)}$.

U is an n-by-n matrix, small entries, invertible mod q.

We will lift mod q polynomials to polynomials having integer coefficients in the range $(-\frac{1}{2}q, \frac{1}{2}q]$. Define rings and fields $$\mathcal{R}_f = \frac{\mathbb{Z}[x]}{(f(x))}, \mathcal{R}_F = \frac{\mathbb{Z}[y]}{(F(y))}, \mathcal{R}_{f,q} = \frac{\mathbb{F}_q[x]}{(f(x))}, \mathcal{R}_{F,q} = \frac{\mathbb{F}_q[y]}{(F(y))}.$$

And define lattices $$L_h = \{(u,v) \in \mathcal{R}_f^2 : v \equiv h \cdot u \pmod{q}\},$$

$$L_H = \{(U,V) \in \mathcal{R}_F^2 : V \equiv H \cdot U \pmod{q}\}.$$

We use U to define polynomials $c_1(x), \ldots, c_n(x) \in \mathbb{F}_q[x]$ of degree less than n by $$\begin{pmatrix} c_1(x) \\ c_2(x) \\ \vdots \\ c_n(x) \end{pmatrix} \equiv U^{-1} \begin{pmatrix} x \\ x^2 \\ \vdots \\ x^n \end{pmatrix} \pmod{q, f(x)}.$$

For $1 \leq j \leq n$ we let $$C_j(y) = c_j(\phi(y)) \in \mathcal{R}_{F,q}$$

be the corresponding polynomials in the y-field.

Security Assumption

As U ranges over matrices with small coefficients that are invertible modulo q, the coefficients of $U^{-1}$ mod q are uniformly distributed.

The polynomials $c_1(x), c_2(x), \ldots, c_n(x)$ form a basis for $\mathcal{R}_{f,q}$ and $C_1(y), C_2(y), \ldots, C_n(y)$ form a basis for $\mathcal{R}_{F,q}$. Each $C_j(y)$ is the image of the corresponding $c_j(x)$ under the isomorphism that sends $x \mapsto \phi(y)$. This same isomorphism preserves the coefficients of linear combinations of the $c_j(x)$, that is, $$\Sigma \alpha_j c_j(x) \mapsto \Sigma \alpha_j C_j(y).$$

A key property that the scheme is based on is the fact that as $$U \begin{pmatrix} c_1(x) \\ c_2(x) \\ \vdots \\ c_n(x) \end{pmatrix} \equiv \begin{pmatrix} x \\ x^2 \\ \vdots \\ x^n \end{pmatrix} \pmod{q, f(x)},$$

and the coefficients of U are small, that each $x^i$, for $1 \leq i \leq n$ is expressible as a linear combination of the $c_j(x)$ with small coefficients. From this it follows that any polynomial in x with small coefficients, of the form $t(x) = \sum_{i=1}^{n} t_i x^i$, with the $t_i$ small, can in turn be written as a polynomial in $c_j(x)$ with small coefficients.

We will find it convenient to use polynomials reduced modulo $f(x)$, which will necessarily have degree less than or equal to $n-1$, that is, of the form $r(x) = \sum_{i=0}^{n-1} r_i x^i$, with the $r_i$ short. Recall that $f(x) = x^n + f_{n-1} x^{n-1} + \ldots + f_1 x \pm 1$, where $f_i \in \{1, 0, -1\}$. Consequently $$\pm 1 \equiv f_1 x - \ldots - x^n \pmod{f(x)}.$$

and thus $$r(x) \equiv \sum_{i=1}^{n} r_i' x^i \equiv \pm r_0 (-f_1 x - \ldots - x^n) + \sum_{i=1}^{n-1} r_i x^i \pmod{f(x)},$$

where the $r_i'$ are also short, is expressible as a short linear combination of the $c_j(x)$.

Importantly, as the product of any two short polynomials in x remains short, such a product will also be writeable as a short linear combination of the $c_j(x)$. The reverse does not hold: with high probability a random linear combination of $c_j(x)$ with small coefficients will not equal a polynomial in x with small coefficients.

It is this property, that a product of short linear combinations of the $c_j(x)$ that correspond to short polynomials in x can again be written as a short linear combination of the $c_j(x)$, that allows the signer to solve a congruential lattice problem in $L_h$ (just as in pq-NTRUSign) and then map the corresponding solution, with the same coefficients, back to $L_H$.

There are two main security concerns that determine parameters in pq-NTRUSign. One is the problem of recovering the private key from the public NTRU key, and the other is the problem of forgery. Of these, the one that has the biggest impact on parameter size is the public key to private key problem. This is because, to make rejection sampling efficient, the q needs to be chosen large compared to n. This makes the lattice problem somewhat easier and forces an increase in the size of n. The forgery problem requires smaller parameters to achieve the same security levels.

In this context there appear at first to be two NTRU-type problems: Recovering $a(x), b(x)$ from $h(x)$, and recovering the corresponding polynomials $A(y), B(y)$ from $H(y)$.

The $h(x)$ is private, and only revealed if the underlying isomorphism is discovered, in which case the scheme is considered broken. So this lattice problem does not arise.

On the other hand, the $H(y)$ is public, but the corresponding problem of recovering $A(y), B(y)$ from $H(y)$ is not a lattice reduction problem as $A(y), B(y)$ are generic polynomials with coefficients mod q, and not short. And as they are not short, recovery of them would not lead to any advantage.

There is a lattice attack to recover the matrix U from the $C_j(y)$, which would suffice to break the scheme, but the dimension of the lattice required to accomplish this is greater than $n^2$.

For this reason, it appears that it will suffice to set parameters to avoid forgery attacks, which should allow for smaller signatures and better operating characteristics.

Private Information: $f(x), a(x), b(x), h(x), c_1(x), \ldots, c_n(x)$ and U.

Public Information: $F(y), H(y)$ and $C_1(y), \ldots, C_n(y)$.

Digital Document Hash: A pair of mod p vectors $\overline{\delta}, \overline{\epsilon}$ obtained by applying a hash function to the document being signed:

$$\overline{\delta} = \overline{\delta_1, \ldots, \delta_n} \in (-\frac{1}{2}p, \frac{1}{2}p]^n,$$

$\overline{\in} = \overline{\in}_1, \ldots, \overline{\in}_n \in (-\frac{1}{2}p, \frac{1}{2}p]^n,$ Signature: A pair of vectors $\delta = (\delta_1, \ldots, \delta_n) \in (-\frac{1}{2}q, \frac{1}{2}q]^n,$ $\in = (\in_1, \ldots, \in_n) \in (-\frac{1}{2}q, \frac{1}{2}q]^n,$ Verification: A signature on the document hash $(\overline{\delta}, \overline{\in})$ is valid if it satisfies the following three conditions:
(1) $\delta_i \equiv \overline{\delta}_i \pmod{p}$ and $\in_i \equiv \overline{\in}_i \pmod{p}$ for all $1 \le i \le n$.
(2) $|\delta_i| \le \frac{1}{2}q - B$ and $|\in_i| \le \frac{1}{2}q - B$ for all $1 \le i \le n$.
(3) Let $S(y) = \delta_1 C_1(y) + \ldots + \delta_n C_n(y),$ and $T(y) = \in_1 C_1(y) + \ldots + \in_n C_n(y).$ Then $(S,T) \in L_H$, i.e., $T(y) \equiv S(y) H(y) \pmod{q, F(y)}.$ Here B is a fixed small integer used to enable rejection sampling.

Signatures are created as in pq-NTRUSign working in the ring $\mathcal{R}_f = \mathbb{Z}[x]/(f(x))$, with one change. Rather than creating polynomials with small coefficients relative to the standard basis $1, x, \ldots, x^{n-1}$, we instead create polynomials with small coefficients relative to the basis $c_1(x), \ldots, c_n(x)$.

Step 1: Choose $\delta_j$ at random mod q such that $q/2 < \delta_j \le q/2$ and $\delta_j \equiv \overline{\delta}_j \pmod{p}$ and set $s_0(x) = \sum_{j=1}^{n} \delta_j c_j(x).$ Step 2: Define $t_0(x)$ by $t_0(x) \equiv s_0(x) h(x) \pmod{q}$ and write $t_0(x) = \sum_{i=0}^{n-1} t_i x^i.$ Then $(s_0(x), t_0(x)) \in L_h$.

Step 3: Write $t_0(x) = \sum_{j=1}^{n} \eta_j c_j(x)$ for some $\eta_1, \ldots, \eta_n$.

To accomplish this, as described previously, write $t_0(x) = \sum_{i=0}^{n-1} t_i x^i \equiv \sum_{i=1}^{n} t'_i x^i \pmod{f(x)}$ as described previously, and set $(\eta_1, \ldots, \eta_n) = (t'_1, \ldots, t'_n) U(q),$ and select representatives for the $\eta_j$ in the interval $(-q/2, q/2]$. The $\eta_j$ will appear to be randomly and uniformly distributed mod q.

Step 4: Construct $(u(x), v(x)) \in L_h$ such that $u(x) = \sum_{j=1}^{n} \delta_j^{(u)} c_j(x) \text{ and } v(x) = \sum_{j=1}^{n} \delta_j^{(v)} c_j(x),$ with $\delta_j^{(u)}, \delta_j^{(v)}$ small, $\delta_j^{(u)} \equiv 0 \pmod{p}$, and $\delta_j^{(v)} + \in_j \pmod{p}$ for all j.

To construct the desired $(u(x), v(x))$, search for an appropriate $r(x)$ which is short, and set $u(x) = pr(x) a(x)$ and $v(x) = r(x) v(x).$ Such an $r(x)$ must satisfy $r(x) b(x) = \sum_{j=1}^{n} \delta_j^{(v)} c_j(x),$ with the $\delta_j^{(v)}$ small and $\delta_j^{(v)} + \eta_j \equiv \in_j \pmod{p}$,
and also satisfy $pr(x) a(x) = \sum_{j=1}^{n} \delta_j^{(u)} c_j(x),$ with the $\delta_j^{(u)}$ small and $\delta_j^{(u)} \equiv \pmod{p}$.

As $r(x), a(x)$ are short, $r(x) a(x)$ is also short, and we may write $r(x) a(x) = \sum_{i=0}^{n-1} d_i x_i \in \mathcal{R}_f,$ with the $d_i$ small. Then the $\delta_j^{(u)}$ of $pr(x) a(x) = \sum_{j=1}^{n} \delta_j^{(u)} c_j(x),$ are given by $(\delta_1^{(u)}, \ldots, \delta_n^{(u)}) = p(d_0, \ldots, d_{n-1}) U.$ As all the $d_i$ and entries of U are small there is no wraparound mod q and each $\delta_j^{(u)} \equiv 0 \pmod{p}$. Thus for whatever short $r(x)$ we find, the $(\delta_j^{(u)} \equiv 0 \pmod{p}$ condition will hold.

We turn now to finding $r(x)$ short, such that $r(x) b(x) = \sum_{j=1}^{n} \delta_j^{(v)} c_j(x),$ with $\delta_j^{(v)}$ short and $\delta_j^{(v)} \equiv \in_j - \eta_j \pmod{p}$.

To accomplish this, write $b(x) = \sum_i^{n-1} b_i x^i$, set $(b_{0,0}, b_{0,1}, \ldots, b_{0,n-1}) = (b_0, b_1, \ldots, b_{n-1}),$ and define $(b_{i,0}, b_{i,1}, \ldots, b_{i,n-1})$ by $x^i b(x) = b_{i,0} + b_{i,1} x + \ldots + b_{i,n-1} x^{n-1}.$ Let B denote the matrix whose i, j entry is $b_{i,j}$, and let

β=BU.

Note that the entries $\beta_{i,j}$ of β are small because the $b_{i,j}$ and the entries of U are small.

For any $$r(x) = \sum_{i=0}^{n-1} r_i x^i \equiv \sum_{i=1}^{n} r'_i x^i \pmod{f(x)}$$

we have $$r(x)b(x) = (r'_1, r'_2, \ldots, r'_n)\beta \begin{pmatrix} c_1(x) \\ c_2(x) \\ \vdots \\ c_n(x) \end{pmatrix}.$$

To solve for r(x), first define $$(\overline{r'_1}, \overline{r'_2}, \ldots, \overline{r'_n}) \equiv (\overline{\delta_1^{(v)}}, \overline{\delta_1^{(v)}}, \ldots, \overline{\delta_1^{(v)}})\beta^{-1} \pmod{p}$$

and lift each $\overline{r'_j}$ to $r'_j \in (-p/2, p/2]$.

Then define $\delta_{j,9}^{(v)}$ by $$(\delta_1^{(v)}, \ldots, \delta_n^{(v)}) \equiv (r'_1, \ldots, r'_n)\beta.$$

This accomplishes the goal $$r(x)b(x) = \sum_{j=1}^{n} \delta_j^{(v)} c_j(x),$$

with $\delta_j^{(v)} \equiv \overline{\delta_j^{(v)}} \pmod{p}$.

After accomplishing Step 4, we have found a short pair of vectors $(u(x), v(x)) \in L_h$ with the appropriate congruential properties.

Having done so, set $$s(x) = s_0(x) + u(x) \text{ and } t(x) = t_0(x) + v(x).$$

Then $$s(x) = \sum_{j=1}^{n} (\delta_j + \delta_j^{(u)}) c_j(x) \text{ and } t(x) = \sum_{j=1}^{n} (\eta_j + \delta_j^{(v)}) c_j(x).$$

By our construction, $\delta_j + \delta_j^{(u)}$ and $\eta_j + \delta_j^{(v)}$ satisfy the required congruences mod p.

If, in addition, for an appropriate choice of $\mathcal{B}$, $|\delta_j + \delta_j^{(u)}| < q/2 - \mathcal{B}$, and $|\eta_j + \delta_j^{(v)}| < q/2 - \mathcal{B}$, then we accept the signature and release it. If not, we repeat the process.

An argument very similar to that in pq-NTRUSign shows that this guarantees an information free transcript.

Why does short times short=pretty short?:

We will investigate the size of the coefficients of the remainder when a polynomial b(x) is divided by some other polynomial f(x), and in particular, how the coefficients of the remainder depend on the magnitude of the roots of f(x).

Example

Take n=150 and choose f(x) randomly to have the form $f(x)=x^{150}+$(random trinary polynomial of degree 90).

There are roughly $2^{142}$ such f. We next choose random trinary polynoimals $g_1(x)$, $g_2(x)$ of degree 150 and compute $g_1(x)g_2(x)$ mod f(x). A sequence of random trials of f, $g_1$, $g_2$ produced polynomials whose (maximum coefficient, minimum coefficient) were (343,−484),(255,−235),(607,−486),(411,−441),(552,−560), . . .

The spread of the coefficient range is very dependent on the size of the largest complex root of f(x). These roots will in general be considerably smaller if there is a large gap between the leading coefficient of highest degree (150 in the Example) and the non-zero coefficient of highest degree below the leading coefficient (90 in the Example).

Fix integers m≥n>0. Fix a polynomial $$f(x) = \prod_{i=1}^{n} (x - \theta_i) \in \mathbb{C}[x].$$

Let $$b(x) = \sum_{i=0}^{m-1} b_i x^i$$

be chosen with each $b_i$ satisfying some probability distribution. Different coefficients may have different distributions, but we assume that they are independent and have mean 0. (In practice, our b(x) will be a product of plaintexts, so it will be a product of t polynomials whose coefficients are independent and more-or-less uniform in some interval. This means that the coefficients of b(x) each satisfy some sort of t-fold hypergeometric distribution, but note that the middle coefficients will be much larger than the ones near the top and the bottom. That is why we allow the coefficients of our b to have different distributions.) The independence means that $$E(b_i b_j) = E(b_i)E(b_j) = 0 \text{ if } i \neq j,$$

while the numbers $E(b_i^2)$ depend on the distributions satisfied by the various $b_i$.

We perform division with remainder, $b(x) = f(x)q(x) + r(x)$ with $0 \leq \deg r < n$.

As usual, we view the polynomials as vectors, $b = (b_0, \ldots, b_m)$ and $r = (b_0, \ldots, b_n)$ We let V denote the vanderMonde matrix of the $\theta_i$'s, $$V = (\theta_i^j)_{\substack{1 \leq i \leq n \\ 0 \leq j < n}} = \begin{pmatrix} 1 & \theta_1 & \cdots & \theta_1^{n-1} \\ 1 & \theta_2 & \cdots & \theta_2^{n-1} \\ \vdots & & \ddots & \vdots \\ 1 & \theta_n & \cdots & \theta_n^{n-1} \end{pmatrix},$$

and we set $$\theta^{(j)} = \begin{pmatrix} \theta_1^j \\ \theta_2^j \\ \vdots \\ \theta_n^j \end{pmatrix}.$$

Then we set $$b(\theta) = \begin{pmatrix} b(\theta_1) \\ b(\theta_2) \\ \vdots \\ b(\theta_n) \end{pmatrix} = \sum_{j=0}^{m-1} b_j \theta^{(j)},$$

and similarly for $r(\theta)$.

We take the relation $b(x)=f(x)q(x)+r(x)$ and substitute $x=\theta_1, \ldots, \theta_n$. Since $f(\theta_i)=0$, this gives $$r(\theta_i)=b(\theta_i) \text{ for all } 1\leq i\leq n.$$

With our earlier notation, this is simply the equality of vectors $$r(\theta)=b(\theta).$$

Now we observe that since r has degree at most n−1, we can write $r(\theta)$ as $$r(\theta) = \sum_{j=0}^{n-1} r_j \theta^{(j)} = Vr.$$

Hence $$r=V^{-1}b(\theta).$$

We now compute the expected value of $\|r\|^2$ as $b(x)$ varies.

$$\begin{aligned} E(\|r\|^2) &= E(\|V^{-1}b(\theta)\|^2) \quad (1) \\ &= E({}^t b(\theta)^t V^{-1} V^{-1} b(\theta)) \\ &= E\left( \sum_{j,k=0}^{m-1} b_k^t \theta^{(k)t} V^{-1} V^{-1} b_j \theta^{(j)} \right) \\ &= \sum_{j,k=0}^{m-1} E(b_k b_j)^t \theta^{(k)t} V^{-1} V^{-1} \theta^{(j)} \\ &= \sum_{j=0}^{m-1} E(b_j^2)^t \theta^{(j)t} V^{-1} V^{-1} \theta^{(j)} \\ &= \sum_{j=0}^{m-1} E(b_j^2) \|V^{-1} \theta^{(j)}\|^2. \end{aligned}$$

This last formula explains what's going on. If we assume that $f(x)$ is fixed and that deg $b(x)$ is large compared to $n=\deg f(x)$, then we obtain the rough, but useful, estimate $$E(\|r\|^2) \asymp \max_{0 \leq j < m} \left( E(b_j^2) \cdot \max_{1 \leq i \leq n} |\theta_i|^j \right).$$

Which term dominates will depend on the relative size of $E(b_j^2)$ and max $|\theta_i|^j$ for $0\leq j<m$. In our scenario, we have $b(x)=a_1(x) \ldots a_t(x)$ with deg $a_i\approx n$, so $m\approx nt$. The coefficients of the $a_i$ are uniform and small, so most of the coefficients of b are roughly $C^t$. Then $E(\|r\|^2)$ is roughly $C^t$ max $|\theta_i|^{nt}$. So in order for decryption to work, we need roughly $$q > (C \max|\theta_i|^n)^t.$$

As expected, we get exponential growth in t. But this shows very clearly how the largest root of $f(x)$ has a major influence on the required size of q. Definition:

Let $f(x) \in C[x]$ be a monic polynomial and let $\theta_1, \ldots, \theta_n$ be the roots of f. We let $$\mathcal{M}(f) = \max_{1 \leq i \leq n} |\theta_i|.$$

Experiments clearly reveal the effect of the size of the roots of $f(x)$. We fixed an $f(x)$ of degree 11, chose 100 polynomials $g(x)$ of degree 32 with random coefficients in $[-2,2]$ and computed the largest coefficients of $g(x)$ modulo $f(x)$. We used the polynomials $$f_1(x)=x^{11}-x^{10}+x^9+x^6-x^5+x^2-x-1$$

$$f_2(x)=x^{11}+x^{10}+x^5-x^4+x^3-x^2-x-1$$

$$f_3(x)=x^{11}-x^{10}+x^7+x^6+x^5-x^3-x^2-1.$$

Then

| $f$ | $\mathcal{M}(f)$ | Avg $|g \bmod f|_\infty$ | St. Dev. $|g \bmod f|_\infty$ |
|---|---|---|---|
| $f_1$ | 1.1835 | 43.420 | 16.226 |
| $f_2$ | 1.3511 | 352.250 | 191.452 |
| $f_3$ | 1.4307 | 1167.720 | 666.196 |

We now consider if there is an advantage in taking the non-zero coefficients of $f(x)$ to be in the lower degree terms. So we take $f(x)$ to have the form $$f(x)=x^n+\tilde{f}(x),$$

where $\tilde{f}(x)$ is random trinary of small degree. Simple estimates make it clear that such polynomials tend to have smaller roots than polynomials whose non-zero monomials have higher degree. In order to compare with our experiments, we took polynomials $f(x)$ of degree 11 with non-zero coefficients only on monomials of degree at most 4, more precisely, we took $$f(x)=x^{11}+a_4x^4+a_3x^3+a_2x^2+a_1x-1$$

with the $a_i$ randomly chosen from $\{\pm 1\}$. The polynomial $$f_4(x)=x^{11}-x^4+x^3-x^2++x-1$$

has $$\mathcal{M}(f_4)=1.18225,$$

so $\mathcal{M}(f_4)$ is comparable to $\mathcal{M}(f_1)$ for the $f_1(x)$ above.
For $f_4$ and 100 samples, we found Avg $|g \bmod f_4|_\infty = 28.450$ and St.Dev. $|g \bmod f_4|_\infty = 15.658$.

These may be compared with the roughly similar values 43.4 and 16.2 for $f_1$. A likely reason for the difference is due to secondary effects due to the other roots. Thus the magnitudes of the roots of $f_1$ are 1.18,1.18,1.15,1.15,1.08,1.08,1.00,1.00,0.890,0.890, 0.578, while the magnitudes of the roots of $f_4$ are 1.18,1.18,1.00,1.00,1.00,1.00,0.953,0.953,0.888, 0.888.

So the second largest root of $f_1$ is significantly larger than the second largest root of $f_4$.

As the above formula makes clear, the size of the inverse of the vanderMonde matrix $V_f$ also has an effect. We list the sup norm and the spectral radius of $V_f^{-1}$ for our two example polynomials.

|  | $f_1$ | $f_4$ |
| --- | --- | --- |
| Spectral Radius of $V_f^{-1}$ | 7.766 | 5.522 |
| Sup Norm of $V_f^{-1}$ | 0.666 | 0.263 |

We note that the remainder coefficients for division by $f_1$ and $f_4$ resemble one another much more closely than do the remainder coefficients for division by $f_2$ or $f_4$. This suggests that it is not so much the distribution of non-zero monomials that affects the remainder coefficients as it is the size of the roots of f. However, if one desires to find an f with comparatively small roots, it is definitely advantageous to select f with non-zero monomials only in the lower degree terms.

The invention claimed is:

1. A method for signing and subsequently verifying a digital message, comprising the following steps implemented using at least one processor-based subsystem:
    generating an irreducible monic polynomial f(x) of degree n in a ring $F_q[x]$;
    generating an irreducible monic polynomial F(y) of degree n in a ring $F_q[y]$;
    producing first and second finite fields as $F_q[x]/(f(x))$ and $F_q[y]/(F(y))$, respectively;
    producing a secret isomorphism from the first finite field to the second finite field;
    producing and publishing a public key that depends on F(y);
    producing a private key that depends on said secret isomorphism;
    producing a message digest by applying a hash function to the digital message;
    producing a digital signature using the message digest and the private key; and
    performing a verification procedure utilizing the digital signature and the public key to determine whether the signature is valid.

2. The method as defined by claim 1, wherein said first and second finite fields are designated, respectively, as x-space and y-space, and further comprising generating a specified lattice in x-space and using said isomorphism to generate a corresponding lattice in y-space, and wherein said step of producing said digital signature includes initially producing a signature in the x-space lattice and then producing the digital signature in the corresponding y-space lattice.

3. The method as defined by claim 1, wherein said secret isomorphism comprises a polynomial.

4. The method as defined by claim 1, further comprising transmitting the digital signature, and wherein said step of performing a verification procedure includes receiving the transmitted digital signature and performing the verification procedure on the received digital signature.

5. The method as defined by claim 2, further comprising transmitting the digital signature, and wherein said step of performing a verification procedure includes receiving the transmitted digital signature and performing the verification procedure on the received digital signature.

6. The method as defined by claim 1, wherein said digital message comprises a challenge communication from a verifier entity, and wherein said digital signature is transmitted to said verifier entity.

7. The method as defined by claim 2, wherein said digital message comprises a challenge communication from a verifier entity, and wherein said digital signature is transmitted to said verifier entity.

8. A method for signing and sending a digital message, comprising the following steps implemented using at least one processor-based subsystem:
    generating an irreducible monic polynomial f(x) of degree n in a ring $F_q[x]$;
    generating an irreducible monic polynomial F(y) of degree n in a ring $F_q[y]$;
    producing first and second finite fields as $F_q[x]/(f(x))$ and $F_q[y]/(F(y))$, respectively;
    producing a secret isomorphism from the first finite field to the second finite field;
    producing and publishing a public key that depends on F(y);
    producing a private key that depends on said secret isomorphism;
    producing a message digest by applying a hash function to the digital message;
    producing a digital signature using the message digest and the private key; and
    transmitting the digital signature.

9. The method as defined by claim 8, wherein said first and second finite fields are designated, respectively, as x-space and y-space, and further comprising generating a specified lattice in x-space and using said isomorphism to generate a corresponding lattice in y-space, and wherein said step of producing said digital signature includes initially producing a signature in the x-space lattice and then producing the digital signature in the corresponding y-space lattice.

10. The method as defined by claim 8, wherein said secret isomorphism comprises a polynomial.

11. The method as defined by claim 8, further comprising receiving the digital signature, and employing a further process-based subsystem for performing a verification procedure on the received digital signature.

12. The method as defined by claim 9, further comprising receiving the digital signature, and employing a further process-based subsystem for performing a verification procedure on the received digital signature.

13. A system for signing and subsequently verifying a digital message, comprising:
    at least one processor-based subsystem that is programmed with instructions that cause the at least one processor subsystem to implement the following steps:
    generating an irreducible monic polynomial f(x) of degree n in a ring $F_q[x]$;
    generating an irreducible monic polynomial F(y) of degree n in a ring $F_q[y]$;
    producing first and second finite fields as $F_q[x]/(f(x))$ and $F_q[y]/(F(y))$, respectively;
    producing a secret isomorphism from the first finite field to the second finite field;
    producing and publishing a public key that depends on F(y);
    producing a private key that depends on said secret isomorphism;
    producing a message digest by applying a hash function to the digital message;
    producing a digital signature using the message digest and the private key; and
    performing a verification procedure utilizing the digital signature and the public key to determine whether the signature is valid.

14. The system as defined by claim 13, wherein said encoded digital signature is transmitted to a further processor-based subsystem, and said further processor-based system is programmed with instructions that cause the further processor-based system to implement said step of performing said verification procedure utilizing the encoded digital signature and the public key to determine whether the signature is valid.

15. The system as defined by claim 13, wherein said first and second finite fields are designated, respectively, as x-space and y-space, and further comprising said at least one processor-based subsystem being programmed with instructions to implement: generating a specified lattice in x-space and using said isomorphism to generate a corresponding lattice in y-space, and wherein said step of producing said digital signature includes initially producing a signature in the x-space lattice and then producing the digital signature in the corresponding y-space lattice.

16. The system as defined by claim 14, wherein said first and second finite fields are designated, respectively, as x-space and y-space, and further comprising said at least one processor-based subsystem being programmed with instructions to implement: generating a specified lattice in x-space and using said isomorphism to generate a corresponding lattice in y-space, and wherein said step of producing said digital signature includes initially producing a signature in the x-space lattice and then producing the digital signature in the corresponding y-space lattice.

17. The method as defined by claim 1, wherein said step of producing a message digest comprises applying a hash function to the digital message and the public key.

18. The method as defined by claim 8, wherein said step of producing a message digest comprises applying a hash function to the digital message and the public key.

* * * * *